United States Patent
Chien et al.

(10) Patent No.: US 12,462,393 B2
(45) Date of Patent: Nov. 4, 2025

(54) METHOD FOR SEGMENTING ROADS IN IMAGES, ELECTRONIC DEVICE, AND STORAGE MEDIUM

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 355 days.

(21) Appl. No.: 18/122,618

(22) Filed: Mar. 16, 2023

(65) Prior Publication Data

US 2024/0177316 A1 May 30, 2024

(30) Foreign Application Priority Data

Nov. 30, 2022 (CN) .......................... 202211528558.8

(51) Int. Cl.
*G06T 7/11* (2017.01)
*G06T 5/20* (2006.01)
*G06T 7/12* (2017.01)

(52) U.S. Cl.
CPC ............... *G06T 7/11* (2017.01); *G06T 5/20* (2013.01); *G06T 7/12* (2017.01); *G06T 2207/20081* (2013.01); *G06T 2207/20084* (2013.01); *G06T 2207/30236* (2013.01); *G06T 2207/30256* (2013.01)

(58) Field of Classification Search
CPC ..... G06T 7/11; G06T 7/12; G06T 5/20; G06T 2207/20081; G06T 2207/20084; G06T 2207/30236; G06T 2207/30256
See application file for complete search history.

(56) References Cited

U.S. PATENT DOCUMENTS

| | | | |
|---|---|---|---|
| 9,547,805 B1 * | 1/2017 | Erignac | G06V 20/182 |
| 10,803,554 B2 * | 10/2020 | Yang | G06F 18/22 |
| 10,810,876 B2 * | 10/2020 | Yamanaka | G06V 20/58 |
| 10,929,694 B1 * | 2/2021 | Zhang | G06F 18/23 |
| 11,042,742 B1 * | 6/2021 | Yang | G06T 7/11 |
| 11,131,753 B2 * | 9/2021 | Banerjee | H04N 5/04 |
| 11,227,493 B2 * | 1/2022 | Han | G08G 1/09623 |
| 11,328,392 B2 * | 5/2022 | Bai | G06T 5/60 |
| 11,651,588 B1 * | 5/2023 | Yeh | G06V 10/82 382/181 |
| 11,710,239 B2 * | 7/2023 | Biswas | G06T 5/20 382/100 |
| 11,875,574 B2 * | 1/2024 | Park | G06V 10/82 |
| 12,254,700 B2 * | 3/2025 | Zhu | G06T 7/20 |
| 2024/0169741 A1 * | 5/2024 | Fowe | G06T 7/20 |

FOREIGN PATENT DOCUMENTS

CN 110910497 3/2020

* cited by examiner

*Primary Examiner* — Gregory M Desire
(74) *Attorney, Agent, or Firm* — ScienBiziP, P.C.

(57) ABSTRACT

A method for segmenting roads in images implemented in an electronic device includes obtaining a road image; obtaining a plurality of regions of interest based on the road image; generating a splicing region based on the plurality of regions of interest; and inputting the splicing region into a pre-trained road segmentation model, and obtaining a road segmentation image and a segmentation result in the road segmentation image.

20 Claims, 7 Drawing Sheets

METHOD FOR SEGMENTING ROADS IN IMAGES, ELECTRONIC DEVICE, AND STORAGE MEDIUM

FIELD

The subject matter herein generally relates to computer vision, and particularly to an electronic device, a method for segmenting roads in images, and a storage medium.

BACKGROUND

In a current road detection technology based on images, due to high brightness of road images captured under a backlit scene, the road in the image is blurred, the road cannot be accurately detected from backlit road images, thereby affecting driving safety in an intelligent driving field.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles so characterized do not exclude other elements or articles. The terms "connect", "link" or the like are not limited to physical or mechanical connection, but may include electrical connections, whether direct or indirect.

Figure 1:
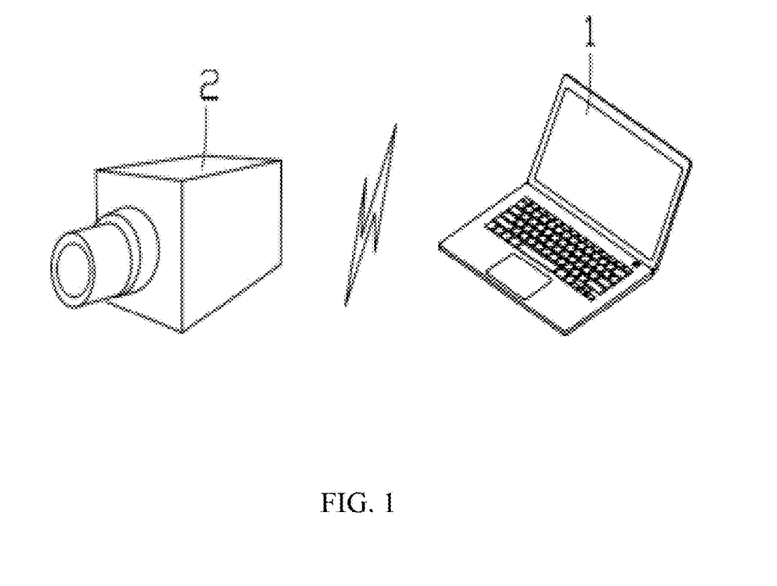
FIG. 1 is a schematic view of an embodiment of application environment of a method for segmenting roads in images according to the present disclosure.
Figure 7:
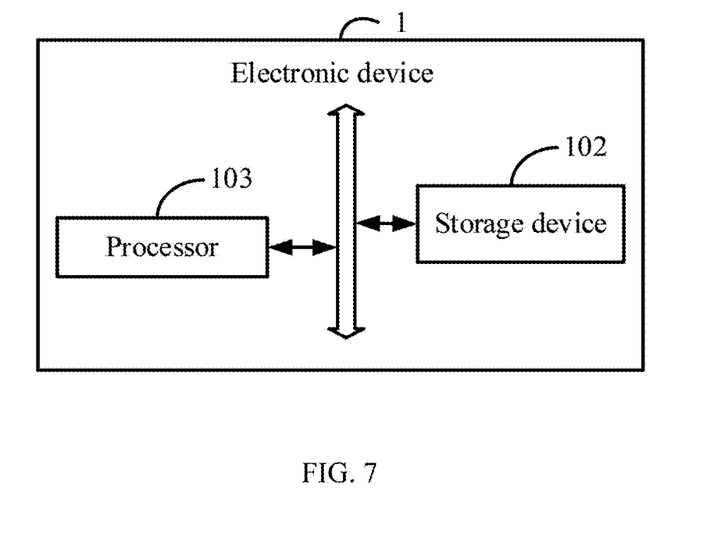
FIG. 7 is a block diagram of an embodiment of an electronic device according to the present disclosure.

Referring to FIG. 1, the image of the application environment of a method for segmenting roads in images can be obtained by the camera device capturing the image of road scene under backlighting, due to the condition of backlighting, the brightness of the image of the application environment is high, the road in the image is blurry. The image of the application environment includes roads, vehicles, trees, sky etc. The method for segmenting roads in images is applied to one or more electronic devices 1 (as shown in FIG. 7). The electronic device 1 communicates with the camera device, and the camera device may be a monocular camera or other devices with a photographing function.

The electronic device 1 is a device that can automatically perform parameter calculation and/or information processing according to preset or pre-stored instructions. The hardware of the electronic device includes, but is not limited to: at least one microprocessor, Application specific Integrated Circuit (ASIC), Field-Programmable gate Array (FPGA), Digital signal Processor (DSP), embedded devices, etc.

The electronic device 1 can be any electronic product capable of man-machine interaction with the user, for example, a personal computer, a tablet computer, a smart phone, a Personal Digital Assistant (PDA), game console, Internet Protocol Television (IPTV), smart wearable devices, etc.

The electronic device 1 may further include at least one model device and/or user device. The model device includes, but is not limited to, a single model server, a server group including a number of model servers, or a cloud (Cloud Computing)-based cloud including a large number of hosts or model servers. The electronic device 1 may also be a vehicle-mounted device in a vehicle. The network environment of the electronic device 1 includes, but not limited to: Internet, wide region network, metropolitan region network, local region network, Virtual Private Network (VPN), etc.

When the electronic device 1 is the vehicle-mounted device, the camera device can be a vehicle-mounted camera device in the vehicle-mounted device, such as a vehicle-mounted camera or a driving recorder. The vehicle-mounted device communicates with the vehicle-mounted camera device.

Figure 2:
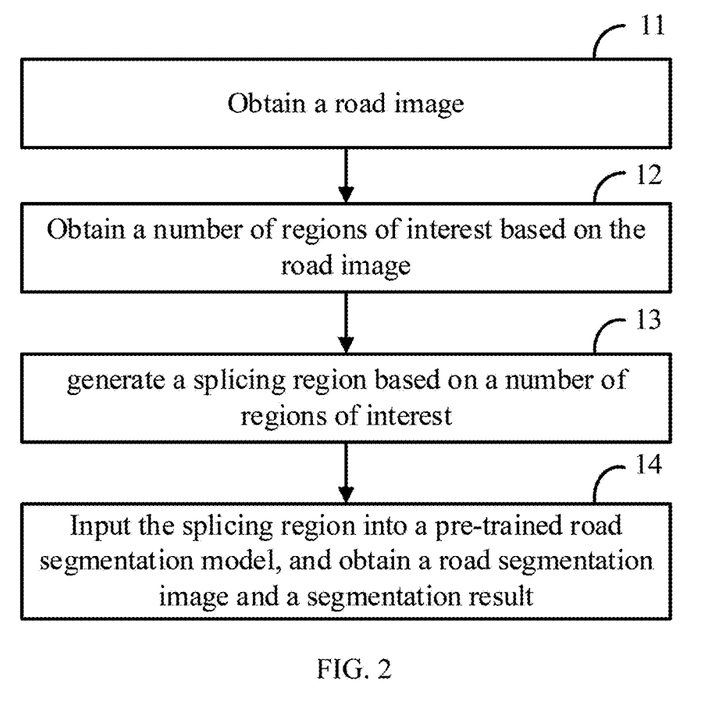
FIG. 2 illustrates a flowchart of an embodiment of a method for segmenting roads in images according to the present disclosure.

FIG. 2 illustrates a flowchart of an embodiment of a method for segmenting roads in images. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 11.

At block 11, an electronic device obtains a road image.

In one embodiment, the road image is an image of three primary colors light (Red Green Blue, RGB), and the road image may include vehicles, roads, lane lines, pedestrians, sky, trees, or other objects.

In one embodiment, the electronic device obtains a road image by obtaining the road images by controlling the camera device to capture images of a road scene.

The camera device may be a monocular camera or a vehicle-mounted camera, etc., and the road scene may include vehicles, roads, lane lines, pedestrians, sky, trees, or other objects.

In one embodiment, the road image includes backlit road images, and the backlit road image is an image obtained by capturing the road scene under backlighting by the camera device.

At block 12, the electronic device obtains a number of regions of interest based on the road image.

In one embodiment, a number of regions of interest are obtained by one or more preset image processing methods, the image processing methods include clipping, road detection, Hough Transform, histogram equalization, and binarization, etc. The histogram equalization includes grayscale histogram equalization processing, three-channel histogram equalization processing, and the like.

Figure 3:
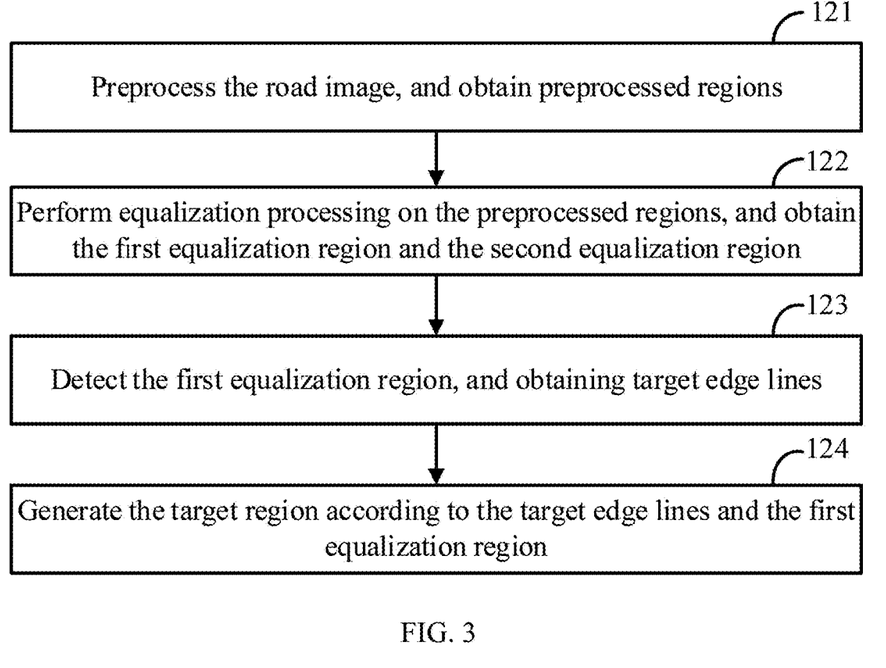
FIG. 3 illustrates a flowchart of an embodiment of an image processing method according to the present disclosure.

In detail, the image processing method based on the road image can be referenced the flowchart in FIG. 3.

FIG. 3 illustrates a flowchart of an embodiment of an image processing method. The method is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 121.

At block 121, the electronic device preprocesses the road images, and obtains preprocessed regions.

In one embodiment, preliminary detection is performed on the road images to determine the position of the road in the road image. For example, in the road image, the road is mainly located in the lower half of the road image, and the upper half of the road image is mainly the distant view and the sky. At this time, the electronic device selects the lower half of the road image as the preprocessed regions.

For example, the preliminary detection may be performed on the road images through a target detection algorithm. The target detection algorithm may be R-CNN, Fast R-CNN, Faster R-CNN, or the like.

In one embodiment, the image clipping can remove the part of the road image that does not include the road, which can reduce the interference to the road detection.

At block 122, the electronic device performs equalization processing on the preprocessed regions, and obtains a first equalization region and a second equalization region.

In one embodiment, the electronic device performs grayscale histogram equalization processing on the preprocessed region, and obtains the first equalization region, and then the electronic device performs histogram equalization processing on each color channel of the preprocessed region, and obtains the second equalization region.

In one embodiment, when the road image is the backlit road image, the grayscale histogram equalization processing and the three-channel histogram equalization processing are performed on the preprocessed region generated after image clipping, which can reduce the brightness of the first equalization region and the second equalized region, so that the influence of brightness on road detection can be reduced.

At block 123, the electronic device detects the first equalization region, and obtains target edge lines.

In one embodiment, the electronic device detects the first equalization region, and obtains target edge lines by: performing road detection on the first equalization region, obtaining a number of original edge lines, calculating a polar coordinate equation of each pixel point on the original edge line, based on the position of each pixel point on each original edge line in the first equalization region, and selecting the target edge lines from the number of original edge lines based on a number of polar coordinate equations.

In one embodiment, the target edge lines include a first target edge line and a second target edge line, and the position of the pixel point includes an abscissa value and an ordinate value. The polar coordinate equation is as follows: $\rho = x \cos \theta + y \sin \theta$, $\rho$ represents the polar radius of the dependent variable, $\theta$ represents the polar angle of the independent variable, x represents the abscissa value of each pixel point, and y represents the ordinate value of each pixel point.

In detail, the electronic device performs road detection on the first equalization region, obtains a number of original edge lines by: performing filtering processing on the first equalization region, obtaining a filtered region; calculating the gradient value of each pixel point in the filtered region; filtering a number of pixel points corresponding to a number of gradient values according to a preset upper threshold and a preset lower threshold, and obtaining a number of edge pixel points, determining a number of lines formed by a number of adjacent edge pixel points to be a number of original edge lines.

In one embodiment, the electronic device calculates the gradient value by a Sobeloperator algorithm. The upper threshold and the lower threshold can be preset according to actual requirement, which is not limited. For example, the upper threshold may be 80, and the lower threshold may be 40.

In one embodiment, by performing road detection on the first equalization region, the original edge lines of a number of possible roads in the first equalization region can be preliminarily detected.

In detail, the electronic device performs filtering processing on the first equalization region, and obtains a filtered region by: selecting a number of convolution pixels from the first equalization region according to a size of a preset convolution kernel, generating a weighting of each convolution pixel according to a position of each convolution pixel, normalizing a number of weightings, generating a Gaussian filter kernel, performing a convolution operation on the first equalization region by the Gaussian filter kernel, and obtaining the filtered region.

In one embodiment, the weighting is calculated according to the following formula:

$$h(x, y) = \frac{1}{2\pi\sigma^2} e^{-\frac{x^2+y^2}{2\sigma^2}}. \tag{1}$$

In the formula (1), h(x,y) represents the weighting of each convolution pixel point, x represents the abscissa value of each convolution pixel point, y represents the ordinate value of each convolution pixel point, and σ is a preset standard deviation. The size of the convolution kernel and the preset standard deviation can be preset according to actual requirement, which is not limited. For example, the size of the convolution kernel may be 3*3, and the standard deviation may be 1.

In one embodiment, by performing filtering processing on the first equalization region, noise in the first equalization region can be filtered out, so that edge lines of roads in the filtered region are clearer.

In detail, the electronic device filters a number of pixel points corresponding to a number of gradient values according to a preset upper threshold and a preset lower threshold, and obtains a number of edge pixel points by: determining the pixel point corresponding to a gradient value that is greater than or equal to the preset upper threshold as the edge pixel point, and determining a pixel point corresponding to a gradient value between the preset upper threshold value and the preset lower threshold value as the middle pixel point, if the middle pixel point is directly connected with any of the edge pixel points, determining the middle pixel point as the edge pixel point, or, if the middle pixel point is not connected with any edge pixel point, removing the middle pixel point. In addition, the electronic device removes the pixel points corresponding to gradient values that are less than or equal to the preset lower threshold.

In one embodiment, since the pixel values of the edge pixel points differ greatly from the pixel values of other pixel points in the first equalization region, and the gradient value can represent the variation of the pixel value, by setting the pixel points corresponding to the gradient value greater than the upper threshold as the edge pixel points, which can improve the accuracy of determining the edge pixel points.

In detail, the electronic device selects the target edge lines from the number of original edge lines based on a number of polar coordinate equations by: drawing a curve corresponding to each polar coordinate equation, selecting the polar angle of each original edge line based on a number of curves, calculating the slope of the edge line of the corresponding original edge line according to the polar angle, selecting the original edge line corresponding to the largest slope of edge line as the first target edge line, and selecting the original edge line corresponding to the smallest slope of edge line as the second target edge line.

Since the dependent variable in each polar coordinate equation is the polar radius, and the independent variable is the polar angle, the coordinates of each point on the curve are the polar radius and the polar angle, the electronic device selects the polar angle corresponding to the intersection points of the curves as the polar angle corresponding to each original edge line. In this embodiment, the slope of the edge line can be a positive number or a negative number. The slope of the edge line of the first target edge line is a positive number, and the slope of the edge line of the second target edge line is a negative number.

In one embodiment, by selecting the target edge lines from the number of original edge lines, the road region in the first equalization region can be preliminarily determined.

Figure 4:
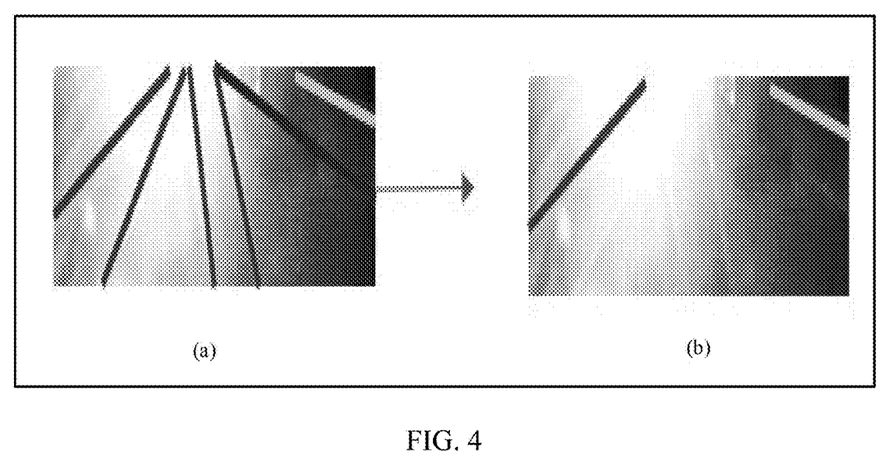
FIG. 4 is a schematic view of an embodiment of an original edge line and a target edge line according to the present disclosure.

Referring to FIG. 4, there are multiple original edge lines in a figure (a) of FIG. 4, the slope of each original edge line is different. Since the slope of the edge line of the leftmost original edge line in the figure (a) of FIG. 4 is the largest, and the slope of the edge line of the rightmost original edge line is the smallest, therefore, the leftmost original edge line in the figure (a) of FIG. 4 is determined as the first target edge line, and the rightmost original edge line is determined as the second target edge line, the target edge lines in a figure (b) of FIG. 4 are obtained.

In other embodiments, other edge detection algorithms may also be used to perform road detection on the first equalization region, such as a Canny edge detection algorithm.

At block 124, the electronic device generates the target region according to the target edge lines and the first equalization region.

In one embodiment, the electronic device generates the target region according to the target edge lines and the first equalization region by: determining an region surrounded by the first target edge line and the second target edge line in the first equalization region as a road region, and performing binarization processing on the first equalization region based on the road region, obtaining the target region.

For example, the electronic device adjusts pixel values of all pixel points in the road region to 1, and adjust pixel values of pixel points in the first equalization region except the road region to 0.

In one embodiment, since the first target edge line is the original edge line corresponding to the largest edge line slope and the second target edge line is the original edge line corresponding to the smallest edge line slope, so it is possible to ensure that all road regions in the first equalization region are selected. In addition, by performing binarization processing on the first equalization region, the road regions in the first equalization region are distinguished from non-road regions. The road region makes the road region in the target region clearer.

In one embodiment, the number of regions of interest include a preprocessing region, a first equalization region, a second equalization region, and a target region. The preprocessed region refers to an region generated after clipping the road image, and the first equalization region refers to an region generated after performing grayscale histogram equalization processing on the preprocessed region, the second equalization region refers to the region generated after performing histogram equalization on each color channel of the preprocessed region, and the target region refers to the region generated after filtering the original edge lines in the first equalization region.

At block 13, the electronic device generates a splicing region based on a number of regions of interest.

In one embodiment, the electronic device generates a splicing region based on a number of regions of interest by: multiplying pixel values of corresponding pixel points in the first equalization region and the target region, and obtaining a first pixel value; adjusting the pixel value of each pixel point in the first equalization region to the first pixel value, and obtaining a first region; multiplying pixel values of corresponding pixel points in the second equalization region and the target region, and obtaining a second pixel value; adjusting the pixel value of each pixel point in the second equalization region to the second pixel value, and obtaining a second region; multiplying pixel values of corresponding pixel points in the preprocessed region and the target region, and obtaining a third pixel value; adjusting the pixel value of each pixel point in the preprocessed region to the third pixel value, and obtaining a third region; obtaining the splicing region by splicing the first region, second region, and the third region.

In this embodiment, the first region, the second region, and the third region are spliced together to obtain the splicing region. Since the splicing region combines the road features of multiple regions, it can make the features of the road in the splicing region more obvious.

In detail, the electronic device obtains the splicing region by splicing the first region, second region, and the third region by: obtaining a first matrix corresponding to the first region, obtaining a second matrix corresponding to the second region, obtaining a third matrix corresponding to the third region, and obtaining the spliced region by spicing the first matrix, the second matrix, and the third matrix. The splicing region may be a three-dimensional region.

At block 14, the electronic device inputs the splicing region into a pre-trained road segmentation model, and obtains a road segmentation image and a segmentation result in the road segmentation image.

In one embodiment, the road segmentation model includes a feature extraction layer, and the feature extraction layer includes a convolution layer, a pooling layer, a batch normalization layer etc. A method for pre-training the road segmentation model is illustrated in FIG. 5.

Figure 5:
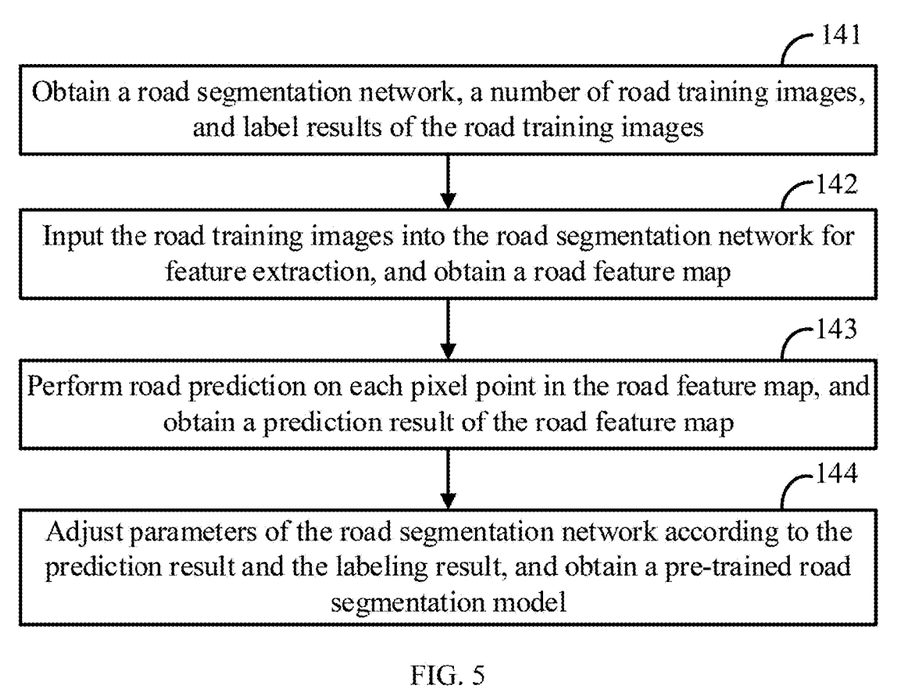
FIG. 5 illustrates a flowchart of an embodiment of a method for training a road segmentation model according to the present disclosure.

FIG. 5 illustrates a flowchart of an embodiment of an image processing method. The method is provided by way of example, as there are a variety of ways to carry out the method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 141.

At block 141, the electronic device obtains a road segmentation network, a number of road training images, and labeling results of the road training images.

In one embodiment, the road segmentation network includes, but is not limited to: SegNet, U-Net, FCN, or other networks. Each road training image includes road, and the labeling results in the number of road training images include a number of labeled pixel points corresponding to the road in each road training image, the labeling positions of the number of labeling pixel points, the quantity of labeling of the number of labeling pixel points, the labeling region formed by the number of labeling pixel points, etc. The labeled pixel points are pixel points corresponding to the road in each road training image.

At block 142, the electronic device inputs the road training images into the road segmentation network for feature extraction, and obtains a road feature map.

In one embodiment, the electronic device extracts the features of the road training image by the feature extraction layer, to obtain the road feature map.

At block 143, the electronic device performs road prediction on each pixel point in the road feature map, and obtains a prediction result of the road feature map.

In one embodiment, the prediction result includes a number of road pixel points corresponding to the road in the road training image, the road positions of the number of road pixel points, the quantity the number of road pixel points, and the pixel region formed by the number of road pixel points etc.

In one embodiment, the electronic device predicts the category of each pixel point in each road feature map, and obtains a number of preset original categories of each pixel point in each road feature map and the probability of each original category, the number of original categories include the road, the electronic device determines the original category corresponding to the maximum probability as the target category, and the electronic device determines a number of pixel points corresponding to the target category as the number of road pixel points, and then the electronic device calculates the quantity of the number of road pixel points, obtains the road position of the road pixel points, and determines the pixel region including the number of road pixel points.

In one embodiment, the number of original categories may be preset according to actual requirement, which is not limited. For example, the original categories include roads, trees, and vehicles, etc.

At block 144, the electronic device adjusts the parameters of the road segmentation network according to the prediction result and the labeling results, and obtains a pre-trained road segmentation model.

In one embodiment, the electronic device adjusts the parameters of the road segmentation network according to the prediction result and the labeling results, and obtains a pre-trained road segmentation model by: calculating a prediction index of the road segmentation network according to the prediction result and the labeling result, adjusts the parameters of the road segmentation network based on the prediction index until the prediction index satisfies a preset condition, and obtaining the pre-trained road segmentation model.

In one embodiment, the prediction index can be a prediction accuracy rate, and the preset condition includes the prediction accuracy rate being greater than or equal to a preset threshold or the prediction accuracy rate no longer increases, the preset threshold value may be preset according to actual requirement, which is not limited.

In detail, if the prediction index is prediction accuracy rate, the electronic device calculates the prediction index of the road segmentation network according to the prediction result and the labeling result by: calculating the training quantity of the number of road training images, calculating the predicted quantity of the prediction result that is the same as the corresponding labeling result, and further calculating the ratio of the predicted quantity to the training quantity, obtaining the prediction accuracy rate.

Figure 6:
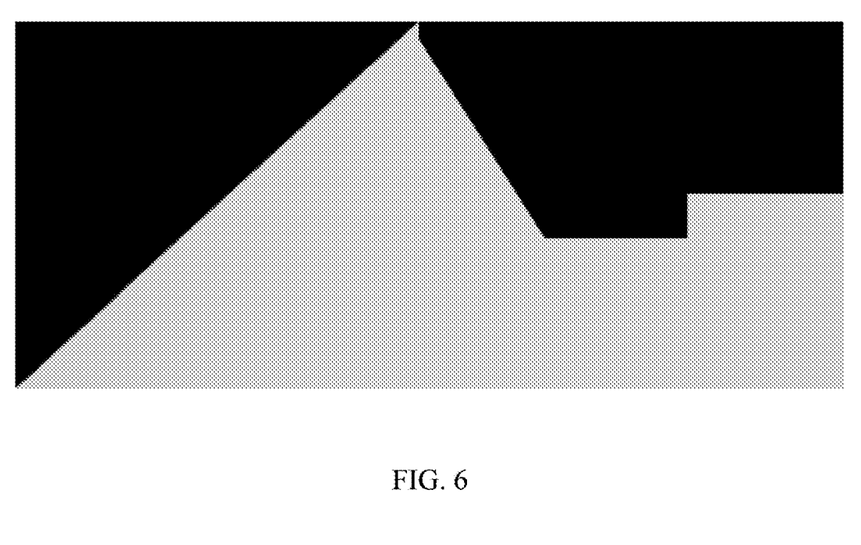
FIG. 6 is a schematic view of an embodiment of a road segmentation image according to the present disclosure.

The generation process of the road segmentation image is the same as the training process of the road segmentation model. Referring to FIG. 6, the lighter colored part is the road region in the road segmentation image.

In this embodiment, the prediction accuracy rate is used to determine whether the road segmentation network converges. When the road segmentation network converges, the prediction accuracy rate is the highest, and the road segmentation model is obtained. Therefore, the detection accuracy of the road segmentation model can be ensured.

In one embodiment, the generation process of the road segmentation image is basically the same as the training process of the road segmentation model, the generation process of the segmentation result is basically the same as the generation process of the prediction result. Since the road image is required to be clipped, after obtaining the road segmented image, it is necessary to readjust the size of the road segmented image so that the size of the road segmented image is the same as the size of the road image same.

It can be seen from the above technical solution that the present application performs image processing on the road image to obtain multiple regions of interest. The image processing includes image clipping, binarization and equalization, road detection, and Hough transform. Since image clipping can the portion of the road image that does not include the road is deleted, thereby reducing interference with road detection. When the road image is a backlight image, by performing binarization and equalization processing on the backlight image, the brightness of the backlight image can be reduced to make the backlight image clearer. By performing road detection on the backlight image, multiple possible original edge lines of the road in the backlight image can be detected, and the multiple possible edge lines are screened by Hough transform to obtain the target edge lines, therefore the accuracy of road detection can be improved. In addition, since more road information is fused in the multiple regions of interest, generating a stitched region based on the multiple regions of interest can make roads in the stitched region clearer. In addition, the pre-trained road segmentation model is used to detect the roads in the stitching region. Since the road segmentation model has learned the location characteristics of the roads, it can more accurately predict the location of the roads in the stitching region.

FIG. 7 illustrates the electronic device 1 in one embodiment. The electronic device 1 includes, but is not limited to, a storage device 102 and a processor 103, and a computer program. FIG. 7 illustrates only one example of the electronic device 1. Other examples can include more or fewer components than as illustrated or have a different configuration of the various components in other embodiments.

The processor 103 can be a central processing unit (CPU), a microprocessor, or other data processor chip that performs functions in the electronic device 1.

In one embodiment, the storage device 102 can include various types of non-transitory computer-readable storage mediums. For example, the storage device 102 can be an internal storage system, such as a flash memory, a random access memory (RAM) for the temporary storage of information, and/or a read-only memory (ROM) for permanent storage of information. The storage device 102 can also be an external storage system, such as a hard disk, a storage card, or a data storage medium.

The storage device 102 stores instructions, the processor 103 executes the computer program 30 stored in the storage device 102 for implementing the method for segmenting roads in images provided in the embodiments of the present disclosure. The computer program can be a road segmenting program and include instructions.

Upon execution of the instructions stores in the storage device 102, the processor 103 is configured to:
obtain road images; obtain a number of regions of interest based on the road images; generate a splicing region based on a number of regions of interest; input the splicing region into a pre-trained road segmentation model, and obtain a road segmentation image and a segmentation result in the road segmentation image.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for segmenting roads in images using an electronic device, the method comprising:
obtaining a road image;
obtaining a plurality of regions of interest based on the road image, comprising: performing a preliminary detection on the road image and determining a position of a road in the road image; determining a preprocessed region according to the position of the road in the road image, wherein the plurality of regions of interest comprise the preprocessed region;
generating a splicing region based on the plurality of regions of interest; and
inputting the splicing region into a pre-trained road segmentation model, and obtaining a road segmentation image and a segmentation result in the road segmentation image.

2. The method according to claim 1, wherein the plurality of regions of interest further comprise a first equalization region, and a second equalization region,
obtaining the plurality of regions of interest based on the road image further comprises:
performing equalization processing on the preprocessed region, and obtaining the first equalization region and the second equalization region;
detecting the first equalization region, and obtaining target edge lines; and
generating a target region according to the target edge lines and the first equalization region.

3. The method according to claim 2, wherein detecting the first equalization regions, and obtaining target edge lines comprises:
performing edge detection on the first equalization region, and obtaining a plurality of original edge lines;
calculating a polar coordinate equation of each pixel point on the original edge line based on a position of each pixel point on each original edge line in the first equalization region; and
selecting the target edge lines from the plurality of original edge lines based on a plurality of polar coordinate equations.

4. The method according to claim 3, wherein performing edge detection on the first equalization region, and obtaining a plurality of original edge lines comprises:
performing filtering processing on the first equalization region, and obtaining a filtered region;
calculating a gradient value of each pixel point in the filtered region;
filtering a plurality of pixel points corresponding to a plurality of gradient values according to a preset upper threshold and a preset lower threshold, and obtaining a plurality of edge pixel points; and
determining a plurality of lines formed by a plurality of adjacent edge pixel points to be the plurality of original edge lines.

5. The method according to claim 3, wherein the target edge lines comprise a first target edge line and a second target edge line,
selecting the target edge lines from the plurality of original edge lines based on a plurality of polar coordinate equations comprises:
drawing a curve corresponding to each of the plurality of polar coordinate equations, and selecting a polar angle of each of the plurality of original edge lines based on a plurality of curves;
calculating a slope of edge line of corresponding original edge line according to the polar angle; and
selecting the original edge line corresponding to the largest slope of edge line as the first target edge line, and selecting the original edge line corresponding to the smallest slope of edge line as the second target edge line.

6. The method according to claim 5, wherein generating a target region according to the target edge lines and the first equalization regions comprises:
determining an region surrounded by the first target edge line and the second target edge line in the first equalization region as a road region; and performing binarization processing on the first equalization region based on the road region, and obtaining the target region.

7. The method according to claim 2, wherein generating a splicing region based on the plurality of regions of interest comprises:
multiplying pixel values of corresponding pixel points in the first equalization region and the target region, and obtaining a first pixel value, adjusting the pixel value of each pixel point in the first equalization region to the first pixel value, and obtaining a first region;
multiplying pixel values of corresponding pixel points in the second equalization region and the target region, and obtaining a second pixel value; adjusting the pixel value of each pixel point in the second equalization region to the second pixel value, and obtaining a second region;
multiplying pixel values of corresponding pixel points in the preprocessed region and the target region, and obtaining a third pixel value; adjusting the pixel value of each pixel point in the preprocessed region to the third pixel value, and obtaining a third region; and
obtaining the splicing region by splicing the first region, second region, and the third region.

8. The method according to claim 1, further comprising:
obtaining a road segmentation network, a plurality of road training images, and labeling results of the road training images;
inputting the road training images into the road segmentation network for feature extraction, and obtaining a road feature map;
performing road prediction on each pixel point in the road feature map, and obtaining a prediction result of the road feature map; and
adjusting parameters of the road segmentation network according to the prediction result and the labeling results, and obtaining the pre-trained road segmentation model.

9. An electronic device comprising:
at least one processor; and
a storage device coupled to the at least one processor and storing instructions for execution by the at least one processor to cause the at least one processor to:
obtain a road image;
obtain a plurality of regions of interest based on the road image, comprising: performing a preliminary detection on the road image and determining a position of a road in the road image; determining a preprocessed region according to the position of the road in the road image, wherein the plurality of regions of interest comprise the preprocessed region;
generate a splicing region based on the plurality of regions of interest; and
input the splicing region into a pre-trained road segmentation model, and obtain a road segmentation image and a segmentation result in the road segmentation image.

10. The electronic device according to claim 9, wherein the plurality of regions of interest further comprise a first equalization region, and a second equalization region, the at least one processor is further caused to:
perform equalization processing on the preprocessed region, and obtain the first equalization region and the second equalization region;
detect the first equalization region, and obtain target edge lines; and
generate a target region according to the target edge lines and the first equalization region.

11. The electronic device according to claim 10, wherein the at least one processor is further caused to:
perform edge detection on the first equalization region, and obtain a plurality of original edge lines;
calculate a polar coordinate equation of each pixel point on the original edge line based on a position of each pixel point on each original edge line in the first equalization region; and
select the target edge lines from the plurality of original edge lines based on a plurality of polar coordinate equations.

12. The electronic device according to claim 11, wherein the at least one processor is further caused to:
perform filtering processing on the first equalization region, and obtain a filtered region;
calculate a gradient value of each pixel point in the filtered region;
filter a plurality of pixel points corresponding to a plurality of gradient values according to a preset upper threshold and a preset lower threshold, and obtain a plurality of edge pixel points;
determine a plurality of lines formed by a plurality of adjacent edge pixel points to be the plurality of original edge lines.

13. The electronic device according to claim 11, wherein the target edge lines comprise a first target edge line and a second target edge line, the at least one processor is further caused to:
draw a curve corresponding to each of the plurality of polar coordinate equations, and select a polar angle of each of the plurality of original edge lines based on a plurality of curves;
calculate a slope of edge line of corresponding original edge line according to the polar angle; and
select the original edge line corresponding to the largest slope of edge line as the first target edge line, and select the original edge line corresponding to the smallest slope of edge line as the second target edge line.

14. The electronic device according to claim 13, wherein the at least one processor is further caused to:
determine an region surrounded by the first target edge line and the second target edge line in the first equalization region as a road region; and
perform binarization processing on the first equalization region based on the road region, and obtain the target region.

15. The electronic device according to claim 10, wherein the at least one processor is further caused to:
multiply pixel values of corresponding pixel points in the first equalization region and the target region, and obtain a first pixel value, adjust the pixel value of each pixel point in the first equalization region to the first pixel value, and obtain a first region;
multiply pixel values of corresponding pixel points in the second equalization region and the target region, and obtain a second pixel value; adjust the pixel value of each pixel point in the second equalization region to the second pixel value, and obtain a second region;
multiply pixel values of corresponding pixel points in the preprocessed region and the target region, and obtain a third pixel value; adjust the pixel value of each pixel point in the preprocessed region to the third pixel value, and obtain a third region; and
obtain the splicing region by splicing the first region, second region, and the third region.

16. The electronic device according to claim 9, wherein the at least one processor is further caused to:
- obtain a road segmentation network, a plurality of road training images, and label results of the road training images;
- input the road training images into the road segmentation network for feature extraction, and obtain a road feature map;
- perform road prediction on each pixel point in the road feature map, and obtain a prediction result of the road feature map; and
- adjust parameters of the road segmentation network according to the prediction result and the labeling results, and obtain the pre-trained road segmentation model.

17. A non-transitory storage medium having instructions stored thereon, when the instructions are executed by a processor of an electronic device, the processor is configured to perform a method for segmenting roads in images, wherein the method comprises:
- obtaining a road image;
- obtaining a plurality of regions of interest based on the road image, comprising: performing a preliminary detection on the road image and determining a position of a road in the road image; determining a preprocessed region according to the position of the road in the road image, wherein the plurality of regions of interest comprise the preprocessed region;
- generating a splicing region based on the plurality of regions of interest; and
- inputting the splicing region into a pre-trained road segmentation model, and obtaining a road segmentation image and a segmentation result in the road segmentation image.

18. The non-transitory storage medium according to claim 17, wherein the plurality of regions of interest further comprise a first equalization region, and a second equalization region, obtaining the plurality of regions of interest based on the road image further comprises:
- performing equalization processing on the preprocessed region, and obtaining the first equalization region and the second equalization region;
- detecting the first equalization region, and obtaining target edge lines; and
- generating a target region according to the target edge lines and the first equalization region.

19. The non-transitory storage medium according to claim 18, wherein detecting the first equalization regions, and obtaining target edge lines comprises:
- performing edge detection on the first equalization region, and obtaining a plurality of original edge lines;
- calculating a polar coordinate equation of each pixel point on the original edge line based on a position of each pixel point on each original edge line in the first equalization region; and
- selecting the target edge lines from the plurality of original edge lines based on a plurality of polar coordinate equations.

20. The non-transitory storage medium according to claim 19, wherein performing edge detection on the first equalization region, and obtaining a plurality of original edge lines comprises:
- performing filtering processing on the first equalization region, and obtaining a filtered region;
- calculating a gradient value of each pixel point in the filtered region;
- filtering a plurality of pixel points corresponding to a plurality of gradient values according to a preset upper threshold and a preset lower threshold, and obtaining a plurality of edge pixel points; and
- determining a plurality of lines formed by a plurality of adjacent edge pixel points to be the plurality of original edge lines.

* * * * *